Nov. 3, 1942.　　　　B. PRATT　　　　2,300,961
GAS RANGE STRUCTURE
Filed Dec. 29, 1938　　　5 Sheets-Sheet 1
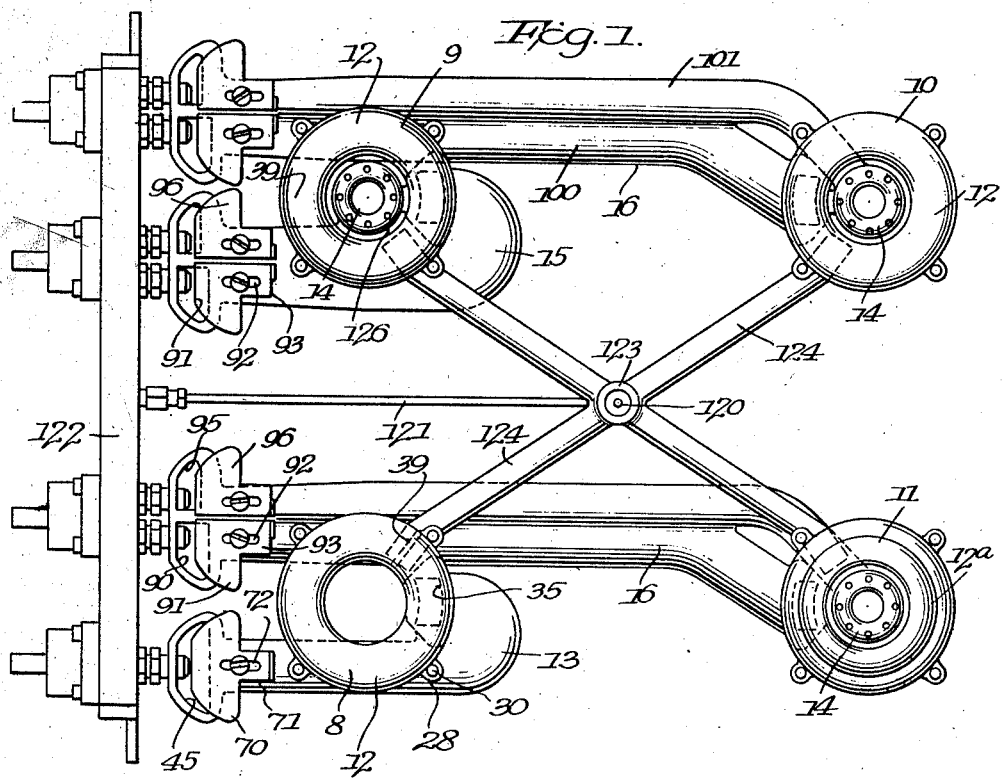
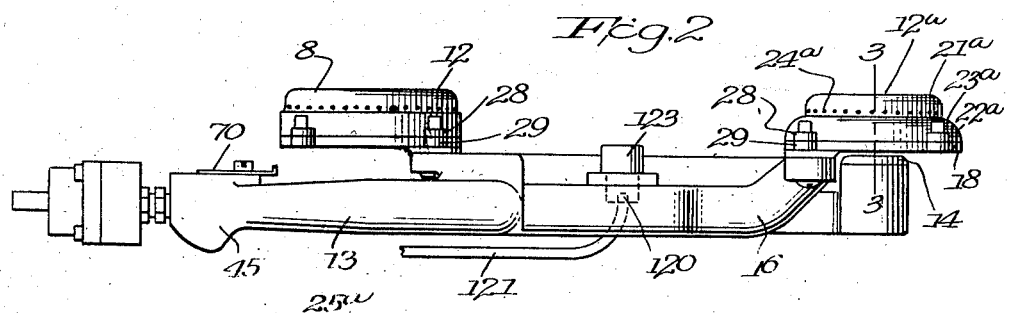
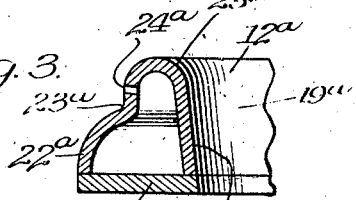
Inventor
Best Pratt Nov. 3, 1942.   B. PRATT   2,300,961
GAS RANGE STRUCTURE
Filed Dec. 29, 1938   5 Sheets-Sheet 2
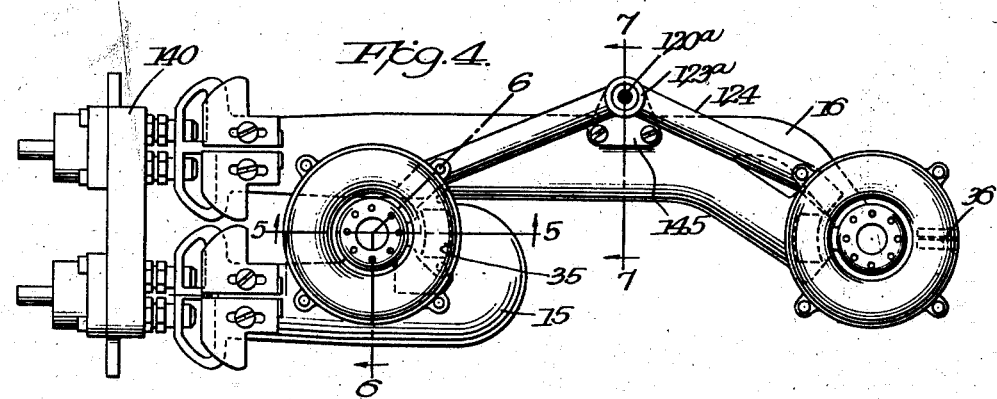
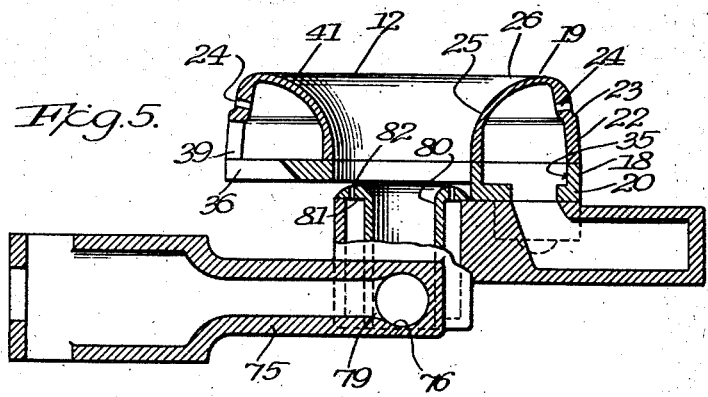
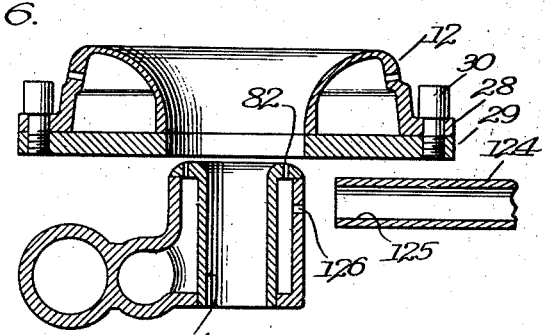
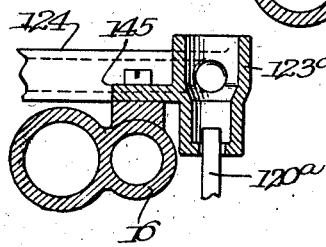
Inventor
Best Pratt Nov. 3, 1942.  B. PRATT  2,300,961
GAS RANGE STRUCTURE
Filed Dec. 29, 1938  5 Sheets-Sheet 3

Inventor
Best Pratt
By Cushman, Darby & Cushman
Attorneys

Nov. 3, 1942.                B. PRATT                 2,300,961
                         GAS RANGE STRUCTURE
                       Filed Dec. 29, 1938          5 Sheets-Sheet 4
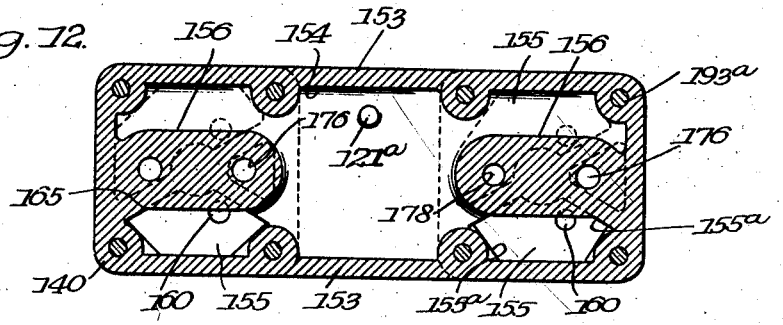
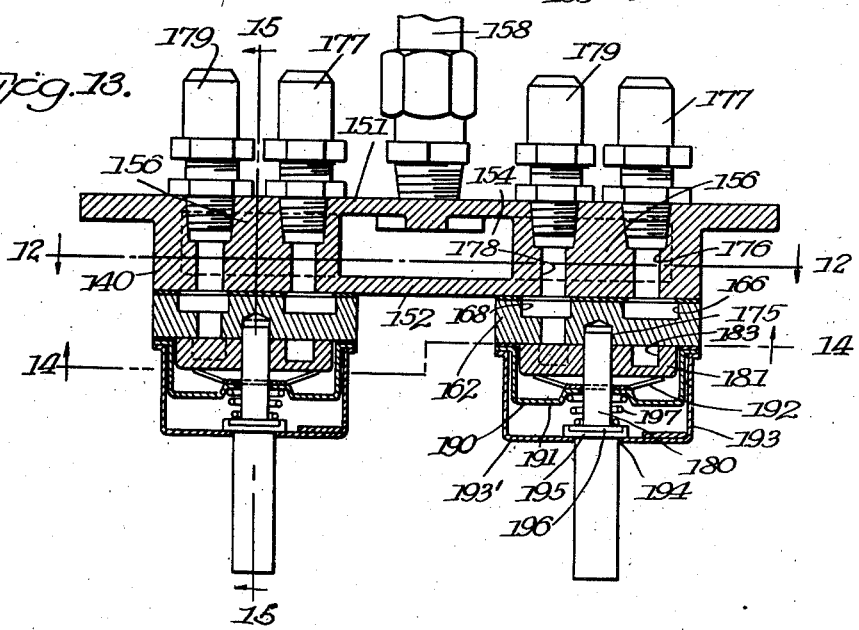
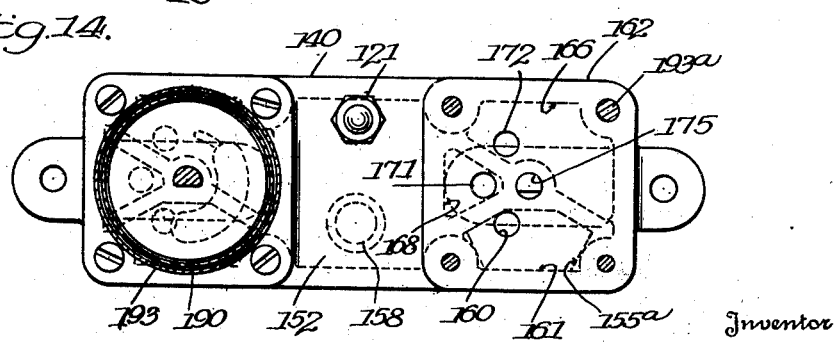
Inventor
Best Pratt Nov. 3, 1942.                B. PRATT                    2,300,961
                         GAS RANGE STRUCTURE
                       Filed Dec. 29, 1938            5 Sheets-Sheet 5
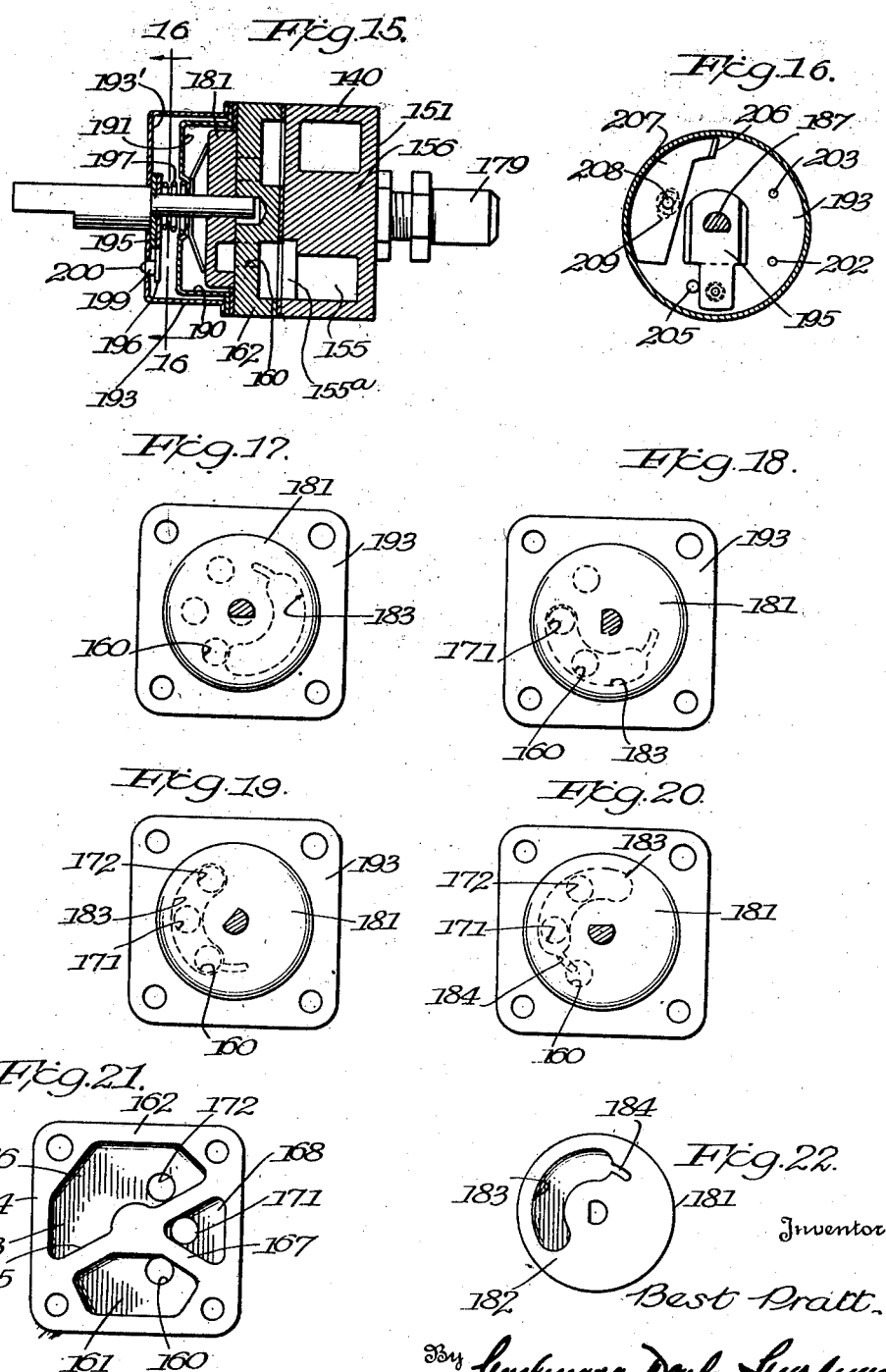

Patented Nov. 3, 1942

2,300,961

UNITED STATES PATENT OFFICE 2,300,961

GAS RANGE STRUCTURE

Best Pratt, Chicago, Ill., assignor to Brake Equipment & Supply Company, Chicago, Ill., a corporation of Illinois Application December 29, 1938, Serial No. 248,337

1 Claim. (Cl. 251—165)

The present invention relates to gas range structures.

The principal objects of the invention are to provide novel forms of burners, mixing tubes, manifolds, and valves for use with gas ranges, all of which elements are efficient in operation and can be very economically manufactured.

Other objects and advantages of the invention will be apparent from the following specification and drawings wherein:

Figure 1 is a plan view of a gas range burner box fitted with devices of the present invention.

Figure 2 is a side elevation of the structure shown in Figure 1.

Figure 3 is a vertical sectional view on the line 3—3 of Figure 2.

Figure 4 is a plan view of a front and rear burner assembly.

Figure 5 is a vertical sectional view on the line 5—5 of Figure 4.

Figure 6 is a vertical sectional view on the line 6—6 of Figure 4.

Figure 7 is a vertical sectional view on the line 7—7 of Figure 4.

Figure 12 is a sectional view on the line 12—12 of Figure 8 and also on the line 12—12 of Figure 13.

Figure 13 is a horizontal sectional view on the line 13—13 of Figure 9.

Figure 14 is a vertical sectional view on the angled line 14—14 of Figure 13.

Figure 15 is a vertical sectional view on the line 15—15 of Figure 13.

Figure 16 is a vertical sectional view on the line 16—16 of Figure 15.

Figures 17 to 20 are front views diagrammatically showing the various positions of the valve of the present invention.

Figure 21 is a rear view of the valve body or face plate of the present invention, and Figure 22 is an elevation of the seat face of the valve disc or element used with the valve structure of the present invention.

Figure 8:
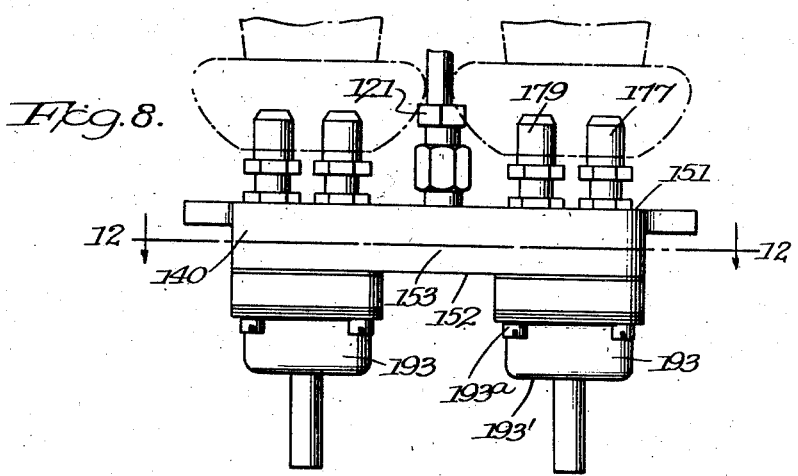
Figure 8 is a plan view of a valve and manifold structure.

The structure for use in a gas range burner box illustrated in Figures 1 and 2 includes front burners 8 and 9 and rear burners 10 and 11. The front burner 8 consists of a single main burner head 12 which receives a mixture of gas and primary air through a single mixing tube 13. The front burner 9 is a double burner and comprises a main burner head 12 and a simmer burner head 14, each of which burner heads is adapted to receive gas and air through a separate passage in a double mixing tube 15. The two rear burners 10 and 11 are both double burners, burner 10 consisting of a main burner head 12 and a simmer burner head 14, each of which separately receives gas and air through a double mixing tube 16. Rear burner 11 comprises a main burner head 12a and a simmer burner 14, main burner 12a being of a form slightly different from the main burner head 12.

The three main burner heads 12 used in the front burners and one rear burner of the Figure 1 assembly are of the construction illustrated in vertical section in Figure 5. As shown in the latter figure, each head 12 includes a base plate 18 and a burner body 19. The base plate 18 is in the form of a flat ring including a downwardly thickened portion or boss 20 adapted to bear upon the upper surface of a mixing tube as hereinafter described. The burner body 19 is annular and of generally inverted U-shaped form in radial section with the outside surfaces of its lower edges of such diameter that it will overlie and fit upon the upper surface of the base plate 18. The outer circumferential wall 22 of the burner body 19 is inclined slightly inwardly from its lower edge and is inwardly offset nearer its upper portion to provide a rounded shoulder 23. Jet ports 24 are circumferentially spaced about the outer wall 22 in a single line and immediately above the offset and rounded shoulder 23. Each of these ports extends through the wall 22 at an angle of about 10° above the horizontal, with the outer or jet end uppermost.

The inner wall 25 of burner body 19 is substantially straight to a point approximately midway of its height and merges into an outwardly curving portion 26 which forms the upper portion of the burner body and joins the rounded upper portion of the outer wall 22. By the above arrangement, any substance which may drop upon the upper portion of the burner during cooking will usually be directed down the inner and blank wall 25 thereof so as not to clog the burner jet ports 24. Because of the steepness of the outer wall 22, any substance which might move down the same will move directly past the jet ports 24. The slight upward inclination of the jet ports 24 will cause the ring of flame formed by the same to be of proper diameter and to extend upwardly about the periphery of the burner.

As best shown in Figure 1, outwardly extending securing lugs 28 are circumferentially spaced about the lower edge of the outer wall 22 of each burner body 19, the lugs 28 being arranged to be aligned with lugs 29 which project outwardly from the burner base plate 18 as indicated in Figure 2. The lugs 29 on the burner plate are threaded to receive a machine screw 30 in a manner similar to that illustrated in Figure 6.

As shown in Figure 5, each burner base 18 has an opening 35 extending through its thickened portion or boss 20 and through which gas may flow into the burner. This opening, illustrated in plan by dotted lines in Figure 2, is of such outline as to be a portion or segment of an annulus.

If the burner is intended to be lighted by a pilot light or from a simmer burner, a radial slot 36 (Figure 5) is provided in the base plate 20, preferably substantially diametrically opposite the gas supply aperture 35, and the outer wall 22 of the burner body 19 associated therewith is similarly slotted as at 39. By this arrangement, when gas issues from the burner jet ports 24 of the burner body, it will also issue from the aligned slots 36 and 39 which, in effect, form a single long slot. Ignition of the gas issuing from such slot will result in a flame which will extend up the side of the burner body to ignite the gas issuing from the burner jet ports 24.

The mixing tube 13 which delivers gas and air to the single-type burner 8 in the lower left-hand portion of Figure 1 is illustrated in detail in my divisional application entitled Mixing tube structures, filed March 27, 1941.

The other front burner illustrated in Figure 1; namely, the burner 9, includes an annular main burner head 12, including a burner base plate 18 and a burner body 19, such as shown in detail in Figures 5 and 6. The burner 9 also includes a central simmer burner head 14. Main burner head 12 and simmer burner head 14 are fitted upon a double mixing tube 15 of the type disclosed in detail in my above identified divisional application entitled Mixing tube structures and comprising a main burner mixing tube or passage 13a and a passage 75 leading to the seat for the simmer burner 14. Throughout the greater portion of its length, the passage 75 extends parallel with the passage 13a leading to the main burner, but just forwardly of the outlet chamber 54a of the passage 13a, the passage 75 is directed outwardly at right angles and opens through a port 76 to an open ended chamber 77 having an inwardly projecting annular flange 78 at its lower end. The inner edge of flange 78 is threaded to receive the lower and threaded end 79 (Figure 5) of a simmer burner cap 80.

As shown in Figure 5, the simmer burner cap 80 is of sleeve form and includes an outwardly extending flange 81 at its upper end having ports 82 circumferentially spaced about the same to form upwardly directed simmer flame jets. The jet apertures 82 are inclined very slightly outwardly from the axis of the cap 80 to spread the ring of flame produced thereby. Gas entering the chamber 77 will circulate between the wall of the chamber and the sleeve portion of the jet cap 80 and move upwardly through the jet ports 82.

It will be noted from Figure 5 that the jet ports 82 of the simmer burner are positioned very slightly below the lower edge of the lower surface of the base plate 18 of the annular main burner 12, and that the outer vertical wall of the chamber 77 is spaced well within the inner wall 25 of the main burner. Thus, the simmer burner 14 will receive an adequate supply of secondary air, this supply being further assured by the construction of the double mixing tube shown in Figures 4 and 5, whereby upward movement of air about the simmer burner 14 is only prevented in the area occupied by the right angled portion of the mixing tube 75, and by the tongue 84 which may be provided in casting to connect the chamber 77 to the forward wall of the outlet chamber 54a of the mixing tube 15. The annular form of the simmer burner further assures an ample supply of secondary air through its central passage.

The fact that the simmer burner cap is spaced inwardly from the inner wall 25 of the annular main burner prevents any substance which might flow down along the wall 25 from dropping upon the jet plate of the simmer burner. It will also be noted from Figure 5 that the simmer burner jet plate is above, or bears on, the mixing tube top wall, so that any substance which might drop from the inner wall 25 of the main burner and onto the upper wall of the mixing passage 75 or the tongue 84 will flow off these surfaces and will not flow into the simmer burner jet ports.

The manner of securing a rear main burner 12 and a simmer burner 14 to the mixing tube 16 will be apparent from the above description of the front burner 9.

The double burner 11 shown in the lower right-hand portion of Figure 1 differs from the rear double burner 10 shown in the upper right hand portion of this figure only in that the main burner body 19a included in burner 11 is designed to produce a smaller flame than the burner body 19 of burner 12.

As shown in side elevation in Figure 2 and in cross-section in Figure 3, the outer wall 22a of burner body 19a of burner 12a curves or bends inwardly from its lowermost portion and forms a shoulder 23a intermediate the height of the burner. From this point upwardly, the wall 22a is substantially vertical and merges with the inner wall 25a which curves downwardly to a vertical portion 26a. The jets 24a of the burner body are positioned above the shoulder 23a and since this portion of the burner body is of reduced diameter, the flame produced may, with usual gas flow adjustment, be somewhat lower in B. t. u. output than the burner body 19 of Figure 5. For example, the burner body of Figure 5 may be operated with an output of 12,000 B. t. u., whereas the burner body 12a of Figure 3 may be used for a 9,000 B. t. u. output. It will be noted that since the burner bodies 19 and 19a are of the same dimensions and shape at their lower edges, both bodies may be applied to similar base plates 18. In other words, the burner body 19a will be provided with laterally extending lugs 28 spaced to fit upon the lugs 29 of a base plate 18. In this way, burner bodies of different capacities may be readily fitted upon similar base plates.

In both forms of burner bodies there is an enlargement in radial section below the burner jet ports, and this enlargement, taken with the curvature, in radial section, of the top portions of the burner bodies, results in a better mixing of air with the gas, and better combustion.

Each of the main burners 12 and 12a is fitted with slots 38 and 41 of the type illustrated in Figure 5 so that these burners may be ignited from a flame produced by their corresponding simmer burners 14. The simmers burners are adapted to be ignited from a pilot burner 120 which receives gas through a suitable supply line 121 extending from the gas stove manifold 122. The pilot burner 120 extends upwardly into a housing 123 which is open at its upper and lower ends. Flame-conducting tubes 124 fixed to housing 123 radiate from the latter, one extending to burners in the range burner box. The manner in which a flame conducting tube 124 communicates with a double burner is best shown in Figure 6 and, as there indicated, the open end 125 of the flame-conducting tube is positioned directly in alignment with a small aperture 126 in the outer wall of the simmer burner. By this arrangement when gas flows to the simmer burner, a portion of the gas will be directed through the aperture 126 to the adjacent end 125 of the flame-conducting tube 124. The gas moving through the latter tube will be ignited at the pilot burner 120 and the resulting flame will issue from the outer end of tube 124 to ignite the gas issuing from the simmer burner jets 82. If the gas-controlling valve has been or is then operated to deliver gas to the main burner, some of the gas entering the main burner will flow from the slot 38 in the burner base plate 18 and be ignited by the simmer burner, this flame moving up the slot 41 to ignite the gas issuing from the ports 24 of the main burner. As shown in the burner structure 9 in the upper left-hand portion of Figure 1, the igniting slot of a main burner is positioned substantially diametrically opposite the igniting port 126 of a simmer burner.

If a burner comprises only a main burner section, as is the case with the burner 8 at the lower left-hand portion of Figure 1, the burner body 19 is so positioned upon the gas mixing tube 13 that the igniting slot 39 thereof will be directly opposite the outer end of the adjacent flame-conducting tube 124. Thus, when gas flows to the single main burner comprising the burner 8, some gas will issue from the slot to be ignited by the flame-conducting tube 124 in the manner described above, and the main burner will thereby be ignited.

Figure 4 shows a front and rear assembly of double burners, of the type described in connection with Figures 3, 5 and 6, the front burner being connected to a double air mixing tube 15 and the rear burner being connected to a double mixing tube 16. The two mixing tubes receive gas from a manifold and valve structure 140 provided with two double valves. A pilot burner 120a is positioned centrally of a pilot housing 123a which includes a flange 145 whereby it may be bolted to the top surface of the double mixing tube 16 as shown in Figure 7. A pair of flame-conducting tubes 124 project to the two burners to ignite the same in the manner described above in connection with Figures 1 and 2.

The installation shown in Figure 4, comprising two burners, and one or both of which may be single burners, is particularly adapted for use in a burner box of the type of range which has a burner box at each end thereof and with the oven between the two burner boxes. Obviously an installation such as illustrated in Figure 4, and including the manifold structure 140, can be fitted to each burner box of this type of range.

Figure 9:
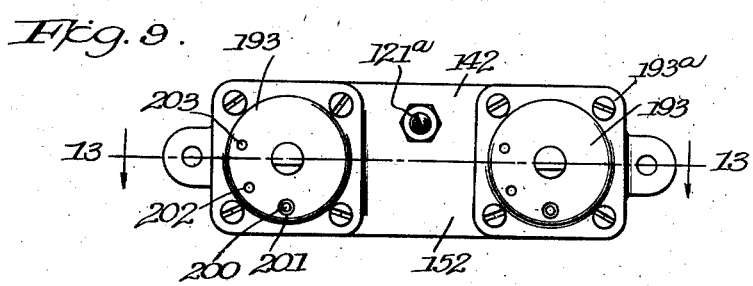
Figure 9 is a front view of the structure shown in Figure 8.
Figure 10:
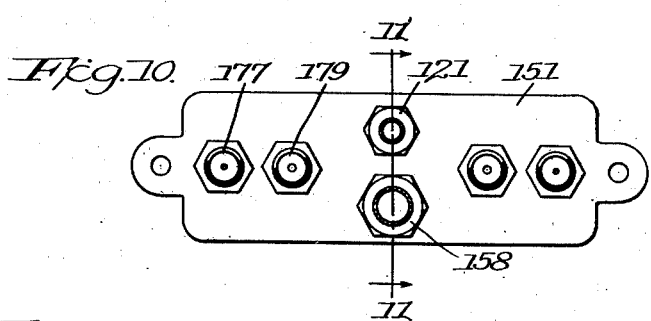
Figure 10 is a rear view of the structure shown in Figure 8.
Figure 11:
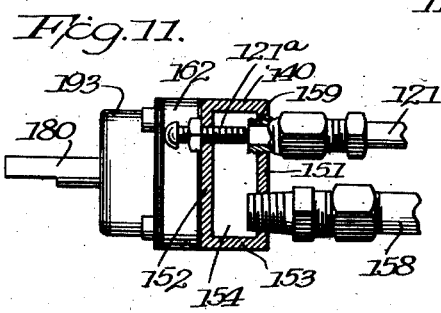
Figure 11 is a vertical sectional view on the line 11—11 of Figure 10.

Figures 8 to 22 relate to the manifold 140 and the valve structures included in the assembly of Figure 4. Referring particularly to Figures 8, 12, 13 and 15, it will be observed that the manifold 140 is a hollow or box-like casting including a rear wall 151 and a front or face wall 152, these walls being joined at their edges by a continuous wall generally indicated by the numeral 153 so as to provide a chamber 154 within the casting. Chamber 154 is positioned at the center of the casting and includes at least two lateral extensions 155 which, as shown in Figure 12, are bounded at their edges by the casting edge wall 153 and two solid or web portions 156 of the casting.

A gas supply pipe or main 158 opens to the chamber 154 through the rear wall 151 to deliver gas to the chamber. The gas thus received in the chamber 154 may flow to a pilot burner tube 121 threaded in a port 159 in the rear wall 151 of the manifold. Such flow to the pilot tube 121 is adjusted by a set screw 121a (Figure 11) threaded through the front wall 152 of the manifold and adapted to be held in adjusted position by a lock nut. It will be observed that this arrangement permits the pilot gas flow to be readily adjusted after the manifold has been positioned on the range. Gas received in chamber 154 may also flow into the lateral extensions 155 thereof and, as shown in Figure 12, a port 155a is provided in the front wall 152 opposite each extension 155 so that gas may move through this port into a chamber 161 provided upon the inner side of a face plate or valve body 162 secured to the front face 152 of the manifold 140.

As best shown in Figure 21, each face plate 162 comprises a front wall 163 and rearwardly projecting and continuous edge walls 164. Three chambers are provided in the rear portion of the face plate or valve body 162. By the preferred construction, a dividing wall 165 extends substantially directly between diagonally opposite portions of the edge wall 164 to form a chamber 166 between one side of the diagonal wall 165 and the oppositely disposed portions of the edge wall 164. The space between the opposite side of the diagonal dividing wall 165 and the opposite portions of the edge walls 164 is divided by a diagonal wall 167 to form two smaller chambers 161 and 168. In the present arrangement, the face plate 162 is so positioned upon the front wall 152 of manifold 140 that the port 155a in the manifold will open to face plate chamber 161. The front wall 163 of the face plate 162 has a supply port 160 therein opening to chamber 161 while the portion of the wall 163 included in chamber 168 has a simmer port 171 therein, an the portion of wall 163 included in chamber 166 has a main burner port 172 opening through the same.

As indicated in Figures 14 and 21, the ports 160, 171 and 172 are arranged on an arcuate line having its axis concentric with a socket 175 in the front wall of the face plate 162, this socket being located at the point at which the webs 165 and 167 converge so that the socket does not open into any of the chambers of the face plate.

Each face plate or valve body 162 is so positioned on the manifold 140, as shown in Figure 14, that the chamber 168 and the chamber 166 will be positioned opposite the web or solid portion 156 of the manifold. By this arrangement, a port 176 extending from the front face to the rear face of manifold 140 and through the right-hand end (Figure 14) of each web 156 of the manifold will open at one end to valve body chamber 166. Thus, valve body port 172, valve body chamber 166 and manifold port 176 form a passage through the valve body and manifold, the rear end of this passage opening to a jet fitting 177 which may project into a main burner mixing tube. A port 178 extending from the front face to the rear face of manifold 140 and through the left-hand portion of each web 156 opens to valve body chamber 168, thereby completing a passage which includes the valve body port 171. A jet fitting 179 is threaded in the rear end of manifold port 178, which fitting may deliver gas to a simmer burner mixing tube. As stated above, face plate (or valve body) chamber 161 is positioned opposite the opening 155a of the manifold 140.

A valve stem 180 has its inner end seated in the valve body socket 175 and the valve stem carries a valve 181 which is of disc form and, as best shown in Figure 22, is provided on its inner seat face 182 with an arcuate groove 183. Rotation of the valve disc 181 with the valve stem 180, as hereinafter described, is adapted to cause the groove 183 to bridge the ports 170, 171 and 172 in the face plate or valve body 162. A short arcuate groove 184 of substantially smaller cross section than groove 183 joins one end of the latter groove.

A flanged cup-shaped housing 190 including an outer plate-like wall 191 is fixed to the front face of face plate or valve body 162, housing 190 completely enclosing the valve element or disc valve 181. Housing 190 has a sealed fit upon the valve body 162 so that it may be filled with grease to lubricate the valve. A bowed spring 192, preferably cruciform, is positioned within the housing 190 with its bight or central portion surrounding the valve stem 180 and bearing upon the housing wall 191, and with the ends of its arms bearing upon the outer face of the valve disc 181.

An outer housing 193 of the same form as inner housing 190 fits over the latter housing. Housing 193 is of greater depth than the inner housing so that a space will be provided between the plate-like outer wall 193' of outer housing 193 and the plate-like wall 191 of inner housing 191. The two housings include flanges at their inner ends of square outline and screws 193a extend through the corner portions of these flanges and through apertures in corner portions of the valve body elements 162 into threaded sockets in the manifold 140. Gaskets of properly cut-out form are preferably interposed between each valve body or face plate 162 and the manifold 140 and between the flange of each inner housing 190 and the outer surface of the corresponding face-plate or valve body 162. The plate-like portions of both housings 190 and 193 have central apertures therein through which the valve stem 180 extends.

The inner end of valve stem 180 includes a flattened portion upon which the valve disc 181 fits so that the latter will rotate with the stem. Immediately adjacent the inner surface of plate-like wall 193' of outer housing 193, valve stem 180 has a flanged member 195 fixed thereto, which flanged member is substantially flat but of U-shaped form in cross section, as shown in Figure 13, so that it embraces a radially projecting arm 196 which is slidable upon, though preferably also keyed to, the valve stem 180. A coil spring 197 is positioned between arm 196 and the central portion of the plate-like wall 191 of the inner housing 190, spring 197 thereby serving to hold the valve stem 180 and the arm 196 outwardly.

As shown in Figures 13 and 15, the outer portion of valve stem 180 may be of larger diameter than the portion inwardly of the flange member 195, and the outer end may be flattened so that an operating knob may be secured thereto. Arm 196 is provided at its free end with a lug 199 from which projects a nub 200 as shown in Figure 15. The outer housing 193 is provided with a relatively large aperture 201 with which the locking arm 196 will be aligned when the valve disc 181 is in position to close off flow of gas and, at this time, the lug 199 will project through aperture 201. Apertures 202 and 203 are also provided in the plate wall of the outer housing 193 on an arcuate line concentric with the valve stem 180, these two apertures being only sufficiently large to permit the nub 200 to project through the same and being respectively positioned at the points along the path of movement of arm 196 at which the valve will permit flow to the simmer burner alone, and to both the simmer burner and the main burner.

In the closed position of the valve 181, the arm 196 will contact with a stop pin 205 which projects inwardly from the plate-like wall 193' of outer housing 193. Movement of the arm 196 in the opposite direction is limited by contact with a shoulder 206 on a plate 207 adjustably secured to the inner surface of the plate-like wall of the outer housing 193 by means of a set screw 208 adapted to extend through an arcuate slot 209 in the plate-like wall. The limit of movement of the valve stem 180 and valve 181 in this direction may thereby be adjusted.

In the assembly of the valve structure shown in Figures 8 to 22, because of the fact that the valve body or plate elements 162 are removable with respect to the manifold 140, the valve body elements may be so fitted upon the manifold as to conform with different range designs. For example, if it is desired to have both of the simmer burner jets 177 lead from adjacent sides of the two valve bodies, it is only necessary to turn the valve body 162 shown at the right in Figures 12 and 13 through a movement of 180° when fitting the valve body upon the manifold. The structure is therefore readily adaptable to different conditions. However, in originally assembling the valve structure for a given range, it is desirable to insure that each valve body 162 will be restored to proper position thereon if subsequently removed, as by using a larger diametered bolt 193a at one corner of each valve body, as shown in Figure 14.

Use of the removable and planar valve body elements is also advantageous because each such element can be readily and economically machined to provide a proper valve seat surface thereon, whereas if a manifold casting is used as a valve body, the proper machining of the same, as well as the casing thereof, involves considerable expense.

In the operation of the valve, with the valve bodies 162 positioned on manifold 140 as shown in the drawings, the valve disc 181 will completely close flow of gas when it is in the position illustrated in Figure 17. In such position, the arcuate groove 183 is out of alignment with the valve body port 160 which opens to the opening 155a in the front wall of the manifold. Flow of gas through the valve will thereby be shut off. At this time, the locking arm 196 of the valve stem will be in contact with the stop pin 205 as shown in Figure 16 and the lug 199 will engage the aperture 201 of housing 193 as shown in Figure 15.

In order to obtain flow of gas to a simmer burner, valve 181 is rotated in a clockwise direction from the position of Figure 17 to the position of Figure 18. Such movement will cause the large arcuate groove 183 of the valve disc to bridge the valve body ports 160 and 171 so that gas will now flow from the central chamber 154 of manifold 140 and through the opening 155a of the manifold front wall to the chamber 161 of the valve body and thence through supply port 160 into the arcuate groove 183 of the valve member and thence through valve body port 171 into valve body chamber 168, which opens to port 178 of the manifold and gas nipple 179. When the valve element 183 is in the position of Figure 18, the nub 200 of locking arm 196 will engage the small aperture 202 about a housing 193 so that the valve stem cannot be accidentally rotated.

Clockwise rotation of the valve disc 183 from the position of Figure 18 to that of Figure 19 will cause gas to flow into the valve disc groove 183 as described above in connection with Figure 18 and to flow outwardly through valve body port 171 as also described in connection with Figure 18 and, in addition, to flow through valve body port 172 which opens to valve body chamber 166. Valve body chamber 166 opens to bore 176 of the manifold 140, which bore communicates with the gas nipple 177. Gas will therefore flow to both the simmer burner and the main burner. In this position of the disc valve 181 the nub 200 of arm 196 will fit the aperture 203 of outer housing 193.

Continued clockwise rotation of valve disc 181 from the position of Figure 19 to that of Figure 20 will cause the large arcuate passage or groove in the valve disc 181 to move out of alignment with the gas supply port 160, and will bring the reduced groove 184 into alignment with the supply port 160. As a result, there will be a reduced flow of gas to both of the nipples 177 and 179 communicating with the respective burners. In this latter position of the valve, the stop arm 196 on the valve stem will contact with the fixed stub shoulder 206 illustrated in Figure 16. By having the plate 207 which carries stub shoulder 206 adjustable circumferentially of the outer housing 193, the limit of rotation of the valve disc 181 can be adjusted so that flow cannot be so reduced as to prevent a continuing flame at the burners.

It will be observed that the valve and manifold structure of Figures 8 to 16 can be readily adapted for use with a single burner by simply plugging either the bore 176 or the bore 178 and positioning the remaining elements accordingly.

Subject matter disclosed but not claimed herein is claimed in my divisional applications for Mixing tube structures and burner structures, filed March 27, 1941.

The terminology used in the specification is not intended to limit the invention, the scope of the invention being indicated in the following claim.

I claim:

A valve structure for gas ranges comprising a valve body, a disc-like valve rotatable upon one face of said valve body, said valve and valve body having ports therein adapted to be placed in communication upon rotation of said valve, a stem rotatable in said valve body and to which said valve is keyed, a cup-shaped housing secured to said valve body to enclose said valve and including an aperture through which said stem extends, a spring between said housing and said disc valve to maintain the valve seated, a second cup-shaped housing secured to said valve body and enclosing said first housing, cooperating means on said valve stem and second housing and entirely within said second housing to hold the valve in adjusted position, and spring means between said housings to hold the engaging means on said valve stem in engagement with the engaging means on said second housing.

BEST PRATT.